US012454185B2

(12) United States Patent
Gudapati et al.

(10) Patent No.: US 12,454,185 B2
(45) Date of Patent: Oct. 28, 2025

(54) TECHNIQUES FOR EXPEDITING ELECTRIFIED VEHICLE PROPULSION FUNCTIONALITIES USING A MULTI-CORE SUPERVISORY CONTROLLER

(71) Applicant: FCA US LLC, Auburn Hills, MI (US)

(72) Inventors: Abhilash Gudapati, Troy, MI (US); Varun Khemchandani, Royal Oak, MI (US); Kunal Waykole, Lake Orion, MI (US)

(73) Assignee: FCA US LLC, Auburn Hills, MI (US)

( * ) Notice: Subject to any disclaimer, the term of this patent is extended or adjusted under 35 U.S.C. 154(b) by 211 days.

(21) Appl. No.: 18/479,375

(22) Filed: Oct. 2, 2023

(65) Prior Publication Data
US 2025/0108699 A1    Apr. 3, 2025

(51) Int. Cl.
*G06F 17/00*    (2019.01)
*B60L 15/20*    (2006.01)
*B60R 16/023*    (2006.01)

(52) U.S. Cl.
CPC .......... *B60L 15/20* (2013.01); *B60R 16/0231* (2013.01); *B60L 2240/80* (2013.01)

(58) Field of Classification Search
CPC .. B60L 15/20; B60L 2240/80; B60R 16/0231; H04L 12/12
USPC .......................................................... 701/22
See application file for complete search history.

(56) References Cited

U.S. PATENT DOCUMENTS 8,606,453 B2 * 12/2013 Bissontz .............. G06F 13/36
   701/55
9,315,187 B2 * 4/2016 Stenson ............ B60W 30/1888
10,525,841 B2    1/2020 Zhou et al.
12,012,089 B2 * 6/2024 Powell ................. G01R 31/367
2011/0130906 A1 * 6/2011 Mayer .................... G07C 5/085
   903/903

(Continued)

FOREIGN PATENT DOCUMENTS

CN    104071153 A    10/2014
CN    105691209 A    6/2016

(Continued)

OTHER PUBLICATIONS

CAN Control System for an Electric Vehicle (Year: 2005).*

(Continued)

*Primary Examiner* — Ronnie M Mancho

(74) *Attorney, Agent, or Firm* — Jeremy J. Klobucar

(57) ABSTRACT

An expedited start-up procedure of an electrified vehicle involves a hybrid control processor (HCP) connected to a controller area network (CAN) having electrified powertrain (ePT) modules and an auxiliary HCP (AHCP) connected to the CAN and connected to the HCP via a hardwire wakeup line. In response to a start-up request, the HCP initializes the start-up procedure in which it sends a wakeup signal to the AHCP via the hardwire wakeup line, performs shutoff path testing via a first CAN bus, and confirms enabled ePT modules communication via a second CAN bus to complete the start-up procedure. In response to the wakeup signal from the HCP, the AHCP initializes and then participates in the start-up procedure in which it wakes up and enables communication by the plurality of ePT modules via the second CAN bus. A duration of the start-up procedure is less than a customer annoyance threshold.

18 Claims, 4 Drawing Sheets

(56) References Cited

U.S. PATENT DOCUMENTS

| | | | | |
|---|---|---|---|---|
| 2011/0144840 A1* | 6/2011 | Ye | ............... | B60W 20/00 |
| | | | | 903/903 |
| 2019/0258251 A1 | 8/2019 | Ditty et al. | | |
| 2021/0309248 A1 | 10/2021 | Choe et al. | | |
| 2022/0134979 A1* | 5/2022 | Holub | ............... | B60W 10/10 |
| | | | | 701/22 |
| 2023/0077695 A1* | 3/2023 | Ambrosio | ............... | B60K 6/40 |
| | | | | 701/22 |
| 2023/0093349 A1* | 3/2023 | Powell | ............... | G01R 31/367 |
| | | | | 701/22 |
| 2023/0298268 A1 | 9/2023 | Oleynikova et al. | | |

FOREIGN PATENT DOCUMENTS

| | | |
|---|---|---|
| CN | 105774589 A | 7/2016 |
| CN | 106335370 A | 1/2017 |
| CN | 108608865 A | 10/2018 |
| CN | 108832683 A | 11/2018 |
| CN | 110281786 A | 9/2019 |
| CN | 110667436 A | 1/2020 |
| CN | 111532136 A | 8/2020 |
| CN | 111890936 A | 11/2020 |
| CN | 112373320 A | 2/2021 |

OTHER PUBLICATIONS

International Search Report and Written Opinion dated Jan. 15, 2025 for International Application No. PCT/US2024/049225, International Filing Date Sep. 30, 2024.

* cited by examiner

TECHNIQUES FOR EXPEDITING ELECTRIFIED VEHICLE PROPULSION FUNCTIONALITIES USING A MULTI-CORE SUPERVISORY CONTROLLER

FIELD

The present application generally relates to electrified vehicles and, more particularly, to techniques for expediting electrified vehicle propulsion functionalities (start-up procedures) using a multi-core supervisory controller.

BACKGROUND

Conventional internal combustion engine (ICE) vehicles are capable of starting (i.e., cranking) within approximately one second from when the customer presses a brake pedal. Electrified vehicles, which may or may not have an ICE and thus may not start the ICE as part of their start-up procedure, typically take longer to achieve propulsion system active and drive ready statuses. This is due to delays associated with the enablement of various electrified powertrain (ePT) electronic control units (ECUs) or modules, cybersecurity requirements, and functional safety testing requirements. A goal of two seconds or less for a complete start-up process has been determined to avoid customer annoyance. One possible solution to decrease the start-up time in electrified vehicles is to leverage the driver door ajar status and to add hardwired wakeup lines for all of the ePT ECUs/modules, but this increases costs and complexity. Accordingly, while such conventional electrified vehicle control systems do work for their intended purpose, there exists an opportunity for improvement in the relevant art.

SUMMARY

According to one example aspect of the invention, a control system for performing an expedited start-up procedure of an electrified vehicle is presented. In one exemplary implementation, the control system comprises a hybrid control processor (HCP) connected to a controller area network (CAN) having a plurality of electrified powertrain (ePT) ECUs/modules and an auxiliary hybrid control processor (AHCP) connected to the CAN and connected to the HCP via a hardwire wakeup line, wherein in response to a start-up request for the electrified vehicle, the HCP is configured to initialize a start-up procedure in which the HCP sends a wakeup signal to the AHCP via the hardwire wakeup line, performs shutoff path testing via a first CAN bus, and confirms communication with the plurality of ePT ECUs/modules via a second CAN bus to complete the start-up procedure, and wherein in response to the wakeup signal from the HCP, the AHCP is configured to initialize and then participate in the start-up procedure in which the AHCP wakes up and enables communication by the plurality of ePT ECUs/modules via the second CAN bus, and wherein a duration of the start-up procedure is less than a customer annoyance threshold.

In some implementations, the customer annoyance threshold is two seconds. In some implementations, the duration of the start-up procedure is in a range of approximately 1760-1830 milliseconds. In some implementations, the HCP does not perform a reset line test. In some implementations, the AHCP and the HCP are configured in a secondary/primary relationship, and wherein the AHCP does not perform shutoff path testing. In some implementations, the HCP and the AHCP are implemented by separate cores of a multi-core processor. In some implementations, the HCP performs the shutoff path testing in parallel while the AHCP wakes up and enables communication by the plurality of ePT ECUs/modules via the second CAN bus. In some implementations, the AHCP is configured to send a first set of network management messages at an enhanced cycle rate to wakeup and enable communication by the plurality of ePT ECUs/modules via the second CAN bus, and wherein the enhanced cycle rate is faster than a normal cycle rate. In some implementations, the first set of network management messages is a first ten messages, the enhanced cycle rate is approximately 100 milliseconds, and the normal cycle rate is approximately 1000 milliseconds.

According to another example aspect of the invention, a control method for an expedited start-up procedure for an electrified vehicle is presented. In one exemplary implementation, the control method comprises providing an HCP connected to a CAN having a plurality of ePT ECUs/modules, providing an AHCP connected to the CAN and connected to the HCP via a hardwire wakeup line, detecting, by the HCP, a startup request for the electrified vehicle and, in response thereto, initializing, by the HCP, a start-up procedure in which the HCP sends a wakeup signal to the AHCP via the hardwire wakeup line, performs shutoff path testing via a first CAN bus, and confirms communication with the plurality of ePT ECUs/modules via a second CAN bus to complete the start-up procedure, and receiving, by the AHCP, the wakeup signal from the HCP and, in response thereto, initializing, by the AHCP, and then participating, by the AHCP, in the start-up procedure in which the AHC wakes up and enables communication by the plurality of ePT ECUs/modules via the second CAN bus, wherein a duration of the start-up procedure is less than a customer annoyance threshold.

In some implementations, the customer annoyance threshold is two seconds. In some implementations, the duration of the start-up procedure is in a range of approximately 1760-1830 milliseconds. In some implementations, the HCP does not perform a reset line test. In some implementations, the AHCP and the HCP are configured in a secondary/primary relationship, and wherein the AHCP does not perform shutoff path testing. In some implementations, the HCP and the AHCP are implemented by separate cores of a multi-core processor. In some implementations, the HCP performs the shutoff path testing in parallel while the AHCP wakes up and enables communication by the plurality of ePT ECUs/modules via the second CAN bus. In some implementations, the AHCP is configured to send a first set of network management messages at an enhanced cycle rate to wakeup and enable communication by the plurality of ePT ECUs/modules via the second CAN bus, and wherein the enhanced cycle rate is faster than a normal cycle rate. In some implementations, the first set of network management messages is a first ten messages, the enhanced cycle rate is approximately 100 milliseconds, and the normal cycle rate is approximately 1000 milliseconds.

Further areas of applicability of the teachings of the present application will become apparent from the detailed description, claims and the drawings provided hereinafter, wherein like reference numerals refer to like features throughout the several views of the drawings. It should be understood that the detailed description, including disclosed embodiments and drawings referenced therein, are merely exemplary in nature intended for purposes of illustration only and are not intended to limit the scope of the present disclosure, its application or uses. Thus, variations that do not depart from the gist of the present application are intended to be within the scope of the present application.

DESCRIPTION

As previously discussed, electrified vehicles typically take longer than conventional internal combustion engine (ICE) vehicles to achieve propulsion system active and drive ready statuses. This is due to delays associated with the enablement of various electrified powertrain (ePT) electronic control units (ECUs) or modules, cybersecurity requirements, and functional safety testing requirements. A goal of two seconds or less for a complete start-up process has been determined to avoid customer annoyance. One possible solution to decrease the start-up time in electrified vehicles is to leverage the driver door ajar status and to add hardwired wakeup lines for all of the ePT ECUs/modules, but this increases costs and complexity. Accordingly, techniques are presented herein that perform at least some of these start-up processes in parallel by a hybrid control processor (HCP) and an auxiliary HCP (AHCP), which could be implemented in separate cores of a multi-core processor. The AHCP has a hardwire wakeup line as it is a secondary module and does not have controller area network (CAN) wakeup capability. The HCP first performs shutoff path testing so it can then communicate via the ePT CAN bus. The conventional HCP reset line test is ignored or skipped as the software can still perform this task to meet functional safety goals. After a quick/immediate wakeup of the AHCP by the HCP via the hardwire wakeup line, the AHCP initializes and then does ePT ECU/module management via the ePT CAN bus. The result is a complete start-up process in under two seconds.

Figure 1:
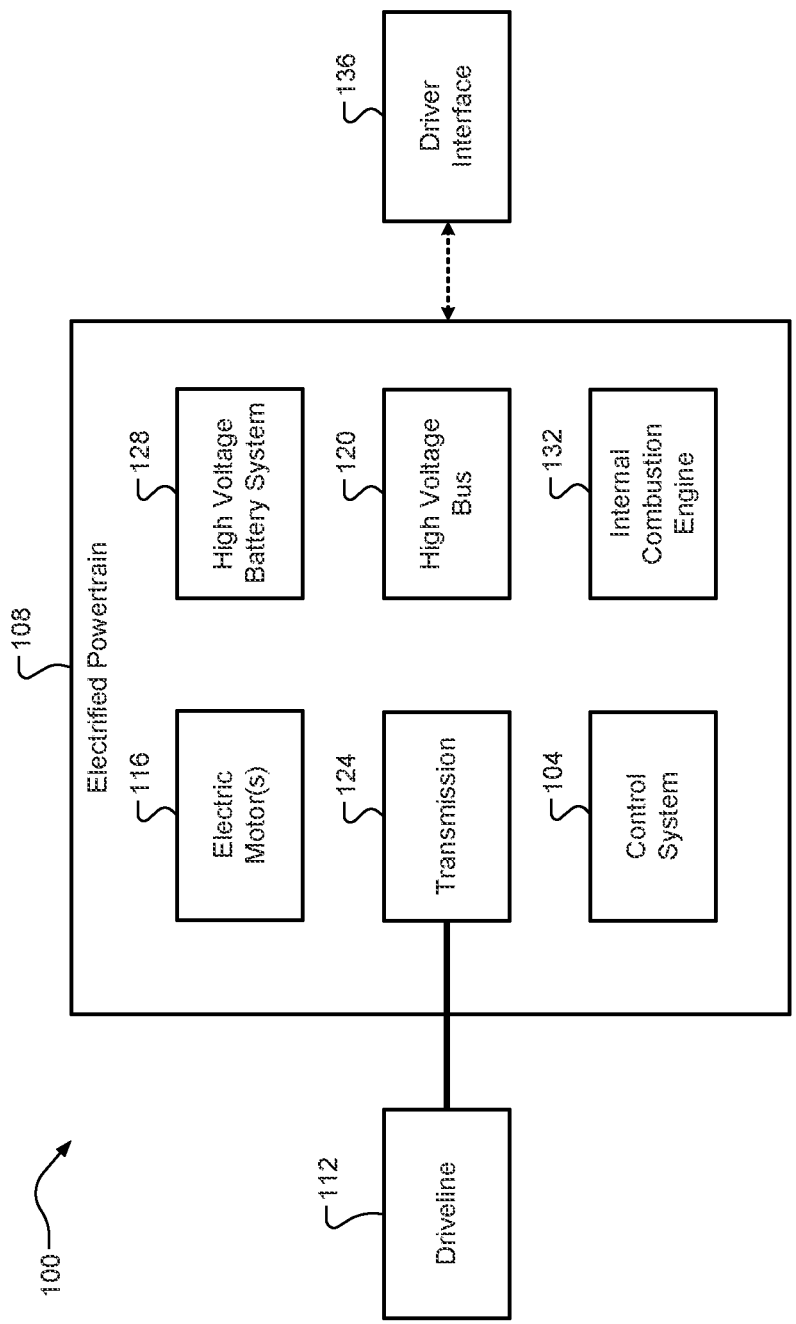
FIG. 1 is a functional block diagram of an electrified vehicle having an example control system configured to perform an expedited start-up procedure according to the principles of the present application.

Referring now to FIG. 1, a functional block diagram of an electrified vehicle 100 having an example control 104 system configured to perform an expedited start-up procedure according to the principles of the present application is illustrated. The electrified vehicle 100 (also referred to as "vehicle 100") includes an electrified powertrain (ePT) 108 configured to generate and transfer torque to a driveline 112 for vehicle propulsion. It will be appreciated that the electrified vehicle 100 could be any suitable type of electrified vehicle, including, but not limited to, a battery electric vehicle (BEV), a plug-in hybrid electric vehicle (PHEV), and a range-extended electrified vehicle (REEV). The electrified powertrain 108 includes one or more electric motors 116 powered by a high voltage bus 120 and configured to generate drive torque (e.g., to satisfy a driver torque request via a driver interface 136) that is selectively transferred to the driveline 112 via a transmission 124.

The high voltage bus 120 is supported or supplied with electrical current to maintain a high voltage level from a high voltage battery system 128 and/or an optional internal combustion engine 132, which generates torque (convertible to electrical energy) by combusting a mixture of air and fuel (diesel, gasoline, etc.). It will be appreciated that the electrified vehicle 100 could include other components, such as a low voltage (e.g., 12 volt) battery system, and other non-illustrated components, such as actuator(s), sensor(s), and/or other human input/output device(s). The control system 104 controls operation of the electrified vehicle 100, including specific startup/power-on processes, and is described in greater detail below.

Figure 2:
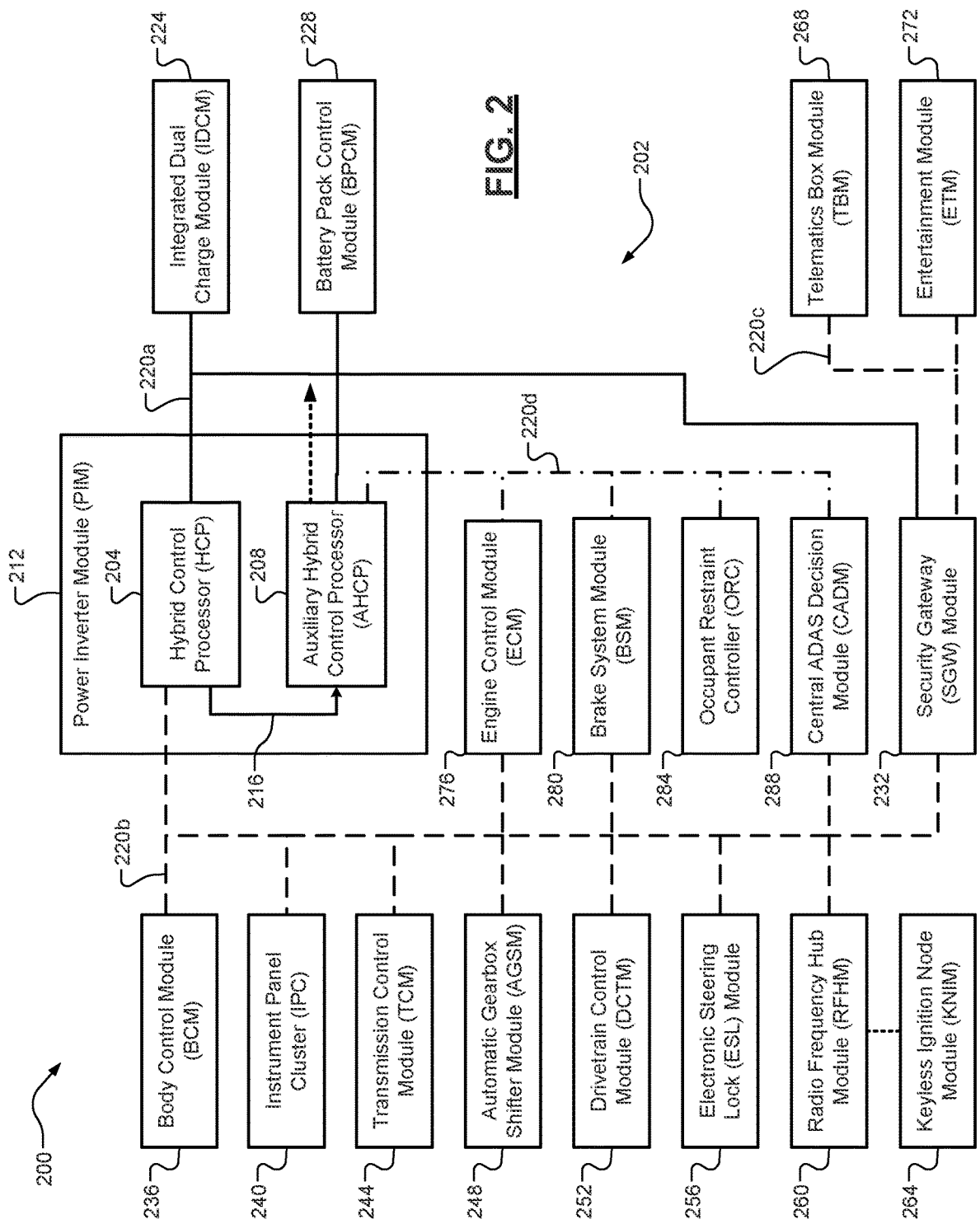
FIG. 2 is a functional block diagram of an example controller area network (CAN) architecture for the example control system of FIG. 1 according to the principles of the present application.

Referring now to FIG. 2 is a functional block diagram of an example controller area network (CAN) architecture 200 for the control system 104 of FIG. 1 according to the principles of the present application is illustrated. It will be appreciated that this is merely one example of the CAN architecture 200 and that the techniques of the present application could be applicable to other suitably configured CAN architectures (e.g., a separate HCP and AHCP with a hardwire wakeup line and no CAN-based communication therebetween). The illustrated components of the control system 104 are all configured to communicate via CAN buses (e.g., CAN buses 220a, 220b, 220c, or 220d) of an overall CAN network 202.

The control system 104 includes an HCP 204 and an AHCP 208 that are both part of a power inverter module (PIM, 212) of the electrified vehicle 100 (e.g., for propulsion control). The HCP 204 and the AHCP 208 are configured as primary/secondary controllers that are separately executable (e.g., by different processors or by different cores of a single multi-core processor) and are only connected via a hardwire wakeup line 216 (and not the CAN 202 or a specific CAN bus). In one exemplary implementation, the CAN 202 is a flexible data-rate (FD) CAN (CAN-FD) having the AUTOSAR® Atlantis High network topology and the first CAN bus 220a is the FD-11 bus, the second CAN bus 220b is the FD-3 bus, the third CAN bus 220c is the FD-8 bus, and the fourth CAN bus 220d is the FD-14 bus. It will be appreciated, however, that the CAN 202 could have other suitable configurations or network topologies.

The HCP 204 and the AHCP 208 are both configured for communication, via the first CAN bus 220a, with an integrated dual charge module (IDCM) 224, a battery pack control module (BPCM) 228, and a security gateway (SGW) module 232 via the first CAN bus 220a. While not separately shown, it will be appreciated that motor control processors (MCPs) could be part of the HCP 204 and, for multi-motor powertrain configurations, the AHCP 208 (e.g., MCPB for a second electric motor 116B could be part of the HCP 204 and MCPA for a first electric motor 116A could be part of the AHCP 208). These ECUs/modules 224, 228, and 232 are also collectively referred to herein as "a plurality of ePT ECUs/modules" that are woken up and enabled by the AHCP 208 while the HCP 204 is performing other parallel processing as part of the techniques of the present application.

The HCP 204 is configured for communication, via the second CAN bus 220b, with a body control module (BCM) 236 (e.g., which may provide the initial startup request, such as in response to a driver door ajar detection), an instrument panel cluster (IPC) 240, a transmission control module (TCM) 244, an automatic gearbox shifter module (AGSM) 248, a drivetrain control module (DCTM) 252, an electronic steering lock (ESL) module 256, and a radio frequency hub module (RFHM) 260. The RFHM 260, for example, could verify the presence/detection of a key fob, via a keyless ignition node module (KNIM) 264, as part of the startup request and startup procedure initiation. The SGW module 232, which is connected (via different CAN buses 220*b* and 220*a*) to the HCP 204 and the AHCP 208, is also connected to non-ePT components, such as a telematics box module (TBM) 268 and an entertainment module (ETM), on the third CAN bus 220*c*.

The HCP 204, via the second CAN bus 220*b*, and the AHCP 208, via the third CAN bus 220*c*, are also configured for communication with an engine control module (ECM) 276, a brake system module (BSM) 280, an occupant restraint controller (ORC) 284 (note that the ORC 284 may not be connected to the HCP 204 via the second CAN bus 220*b*), and a central advanced driver-assistance system (ADAS) decision module (CADM) 288. It will be appreciated that these illustrated components of the control system 104 and the CAN 202 are merely important examples for purposes of the present application and that there could be different numbers/types of components depending on the particular vehicle application.

As shown, the AHCP 208 is also configured to output a wakeup signal to wakeup and enable the plurality of ePT ECUs/modules on the first CAN bus 220*a* (see the dashed arrow pointing at the first CAN bus 220*a*). The AHCP 208 performs this functionality after being woken up by the HCP 204 via the hardwire wakeup line 216 as part of the expedited startup procedure of the present application, which involves parallel and reduced processing by the HCP 204 and the AHCP 208 to achieve a total startup period duration of two seconds or less, which will now be shown and described in greater detail. The details of these specific operations (e.g., communicated messages) can also be seen in the dataflow diagram of FIG. 3, which illustrates an example expedited startup procedure 300 according to the principles of the present application.

Figure 3:
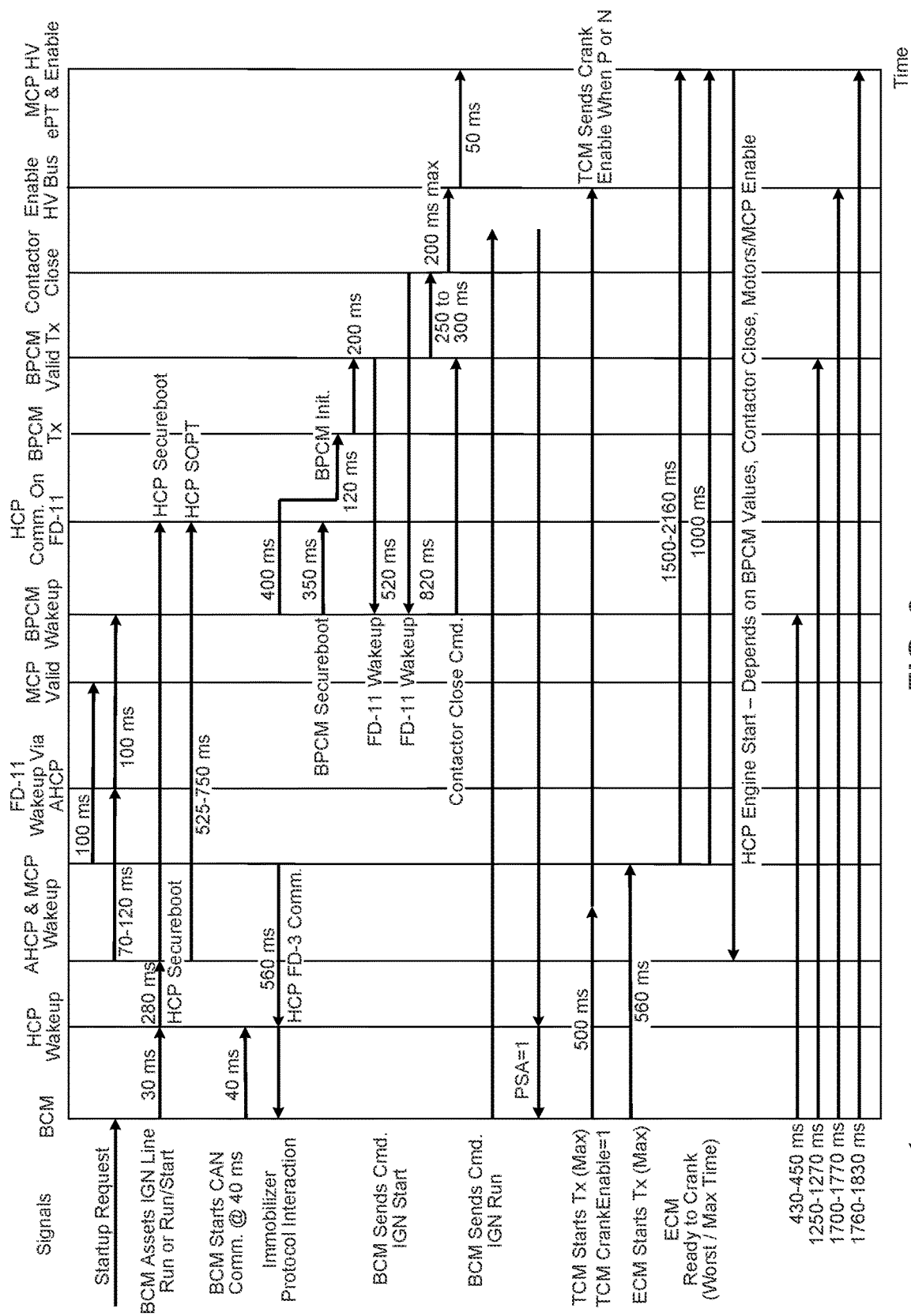
FIG. 3 is a dataflow diagram of an example expedited startup procedure having parallel processing by a hybrid control processor (HCP) and an auxiliary HCP (AHCP) according to the principles of the present application.
Figure 4:
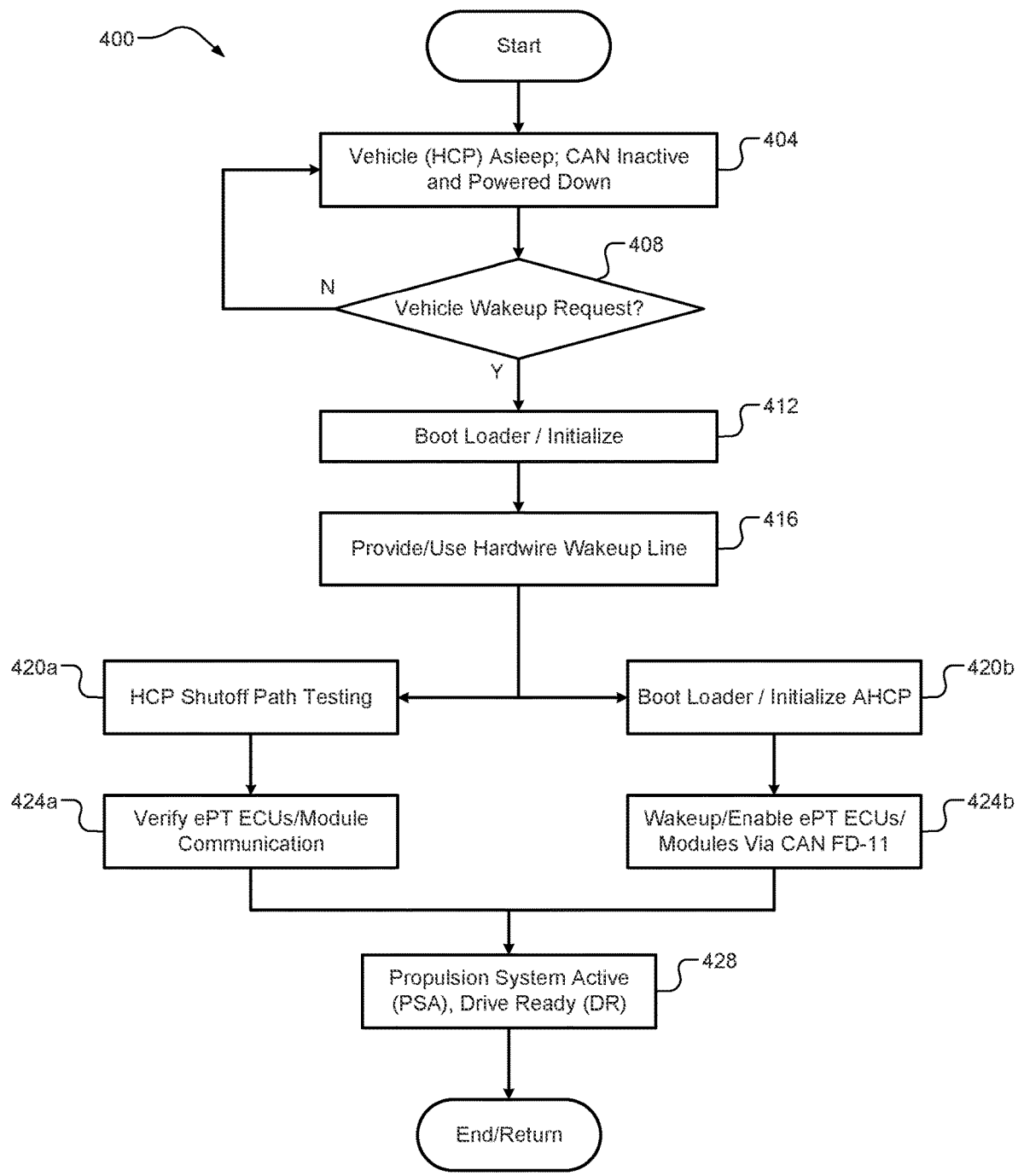
FIG. 4 is a flow diagram of an example control method for an expedited start-up procedure of an electrified vehicle according to the principles of the present application.

Referring now to FIG. 4 and with continued reference to FIGS. 1-3, a flow diagram of an example control method 400 for an expedited start-up procedure of an electrified vehicle according to the principles of the present application. While the electrified vehicle 100 and the control system 104 (and example control architecture 200) are specifically reference for illustrative/descriptive purposes, it will be appreciated that the method 300 could be applicable to any suitable electrified vehicle having a suitably configured CAN-based control network. At 404, the vehicle 100 (the HCP 204) is asleep and the CAN 202 is inactive and powered down. At 408, the control system 104 (the HCP 204) determines whether a wakeup request is generated or received. This could be generated, for example, by the BCM 236 in response to suitable detected signals such as the driver door being open or ajar and the key fob presence being detected. When false, the method 400 returns to 404 where the vehicle 100 remains asleep. When true, however, the method 400 proceeds to 412 where the HCP 204 initialized, which could include executing a boot loader process. At 416, after initializing, the HCP 204 sends a wakeup signal to the AHCP 208 via the hardwire wakeup line 216. After the HCP 204 sends the wakeup signal to the AHCP 208 via the hardwire wakeup line, the method 400 then splits into two parallel processing paths to expedite the startup procedure of the vehicle 100.

At parallel 420*a*, the HCP 204 performs shutoff path testing, which could take a substantial amount of time (e.g., 525-750 milliseconds, as shown in FIG. 3). At parallel 420*b*, the AHCP 208 initialized in response to receiving the wakeup signal from the HCP 204 via the hardwire wakeup line 216, which could similarly include executing a boot loader procedure. Then, at parallel 424*b*, the AHCP 208 wakes up the first (CAN FD-11) CAN bus 220*a* and utilizes this activated CAN bus to communicate with and thereby wakeup and enable a plurality of ePT ECUs/modules, such as the IDCM 224, the BPCM 228, and the SGW module 232.

As previously discussed, the AHCP 208 could leverage the use of faster/expediting messaging or enhanced cycle rates (e.g., 100 milliseconds instead of 1000 milliseconds) for a first number (e.g., 10) of messages via the first CAN bus 220*a* to further expedite the startup procedure of the vehicle 100. Then, at parallel 424*a*, the HCP 204 has completed its shutoff path testing and then verifies communication with the ePT ECUs/modules via the first CAN bus 220*a*. At 428, the startup procedure of the vehicle 100 is complete as the control system determines that the PSA and DR statuses are both true (PSA=1, DR=1). The method 400 then ends.

It will be appreciated that the term "controller" as used herein refers to any suitable control device or set of multiple control devices that is/are configured to perform at least a portion of the techniques of the present application. Non-limiting examples include an application-specific integrated circuit (ASIC), one or more processors and a non-transitory memory having instructions stored thereon that, when executed by the one or more processors, cause the controller to perform a set of operations corresponding to at least a portion of the techniques of the present application. The one or more processors could be either a single processor or two or more processors operating in a parallel or distributed architecture.

It should also be understood that the mixing and matching of features, elements, methodologies and/or functions between various examples may be expressly contemplated herein so that one skilled in the art would appreciate from the present teachings that features, elements and/or functions of one example may be incorporated into another example as appropriate, unless described otherwise above.

What is claimed is:

1. A control system for performing an expedited start-up procedure of an electrified vehicle, the control system comprising:

a hybrid control processor (HCP) connected to a controller area network (CAN) having a plurality of electrified powertrain (ePT) ECUs/modules; and an auxiliary hybrid control processor (AHCP) connected to the CAN and connected to the HCP via a hardwire wakeup line;

wherein in response to a start-up request for the electrified vehicle, the HCP is configured to initialize a start-up procedure in which the HCP:

sends a wakeup signal to the AHCP via the hardwire wakeup line, performs shutoff path testing via a first CAN bus, and confirms communication with the plurality of ePT ECUs/modules via a second CAN bus to complete the start-up procedure; and wherein in response to the wakeup signal from the HCP, the AHCP is configured to initialize and then participate in the start-up procedure in which the AHCP wakes up and enables communication by the plurality of ePT ECUs/modules via the second CAN bus, and wherein a duration of the start-up procedure is less than a predetermined customer annoyance threshold.

2. The control system of claim 1, wherein the customer annoyance threshold is two seconds.

3. The control system of claim 2, wherein the duration of the start-up procedure is in a range of approximately 1760-1830 milliseconds.

4. The control system of claim 1, wherein the HCP does not perform a reset line test.

5. The control system of claim 1, wherein the AHCP and the HCP are configured in a secondary/primary relationship, and wherein the AHCP does not perform shutoff path testing.

6. The control system of claim 1, wherein the HCP and the AHCP are implemented by separate cores of a multi-core processor.

7. The control system of claim 1, wherein the HCP performs the shutoff path testing in parallel while the AHCP wakes up and enables communication by the plurality of ePT ECUs/modules via the second CAN bus.

8. The control system of claim 1, wherein the AHCP is configured to send a first set of network management messages at an enhanced cycle rate to wakeup and enable communication by the plurality of ePT ECUs/modules via the second CAN bus, and wherein the enhanced cycle rate is faster than a normal cycle rate.

9. The control system of claim 8, wherein the first set of network management messages is a first ten messages, the enhanced cycle rate is approximately 100 milliseconds, and the normal cycle rate is approximately 1000 milliseconds.

10. A control method for an expedited start-up procedure for an electrified vehicle, the control method comprising:
providing a hybrid control processor (HCP) connected to a controller area network (CAN) having a plurality of electrified powertrain (ePT) ECUs/modules;
providing an auxiliary hybrid control processor (AHCP) connected to the CAN and connected to the HCP via a hardwire wakeup line;
detecting, by the HCP, a startup request for the electrified vehicle and, in response thereto, initializing, by the HCP, a start-up procedure in which the HCP:
sends a wakeup signal to the AHCP via the hardwire wakeup line,
performs shutoff path testing via a first CAN bus, and
confirms communication with the plurality of ePT ECUs/modules via a second CAN bus to complete the start-up procedure; and
receiving, by the AHCP, the wakeup signal from the HCP and, in response thereto, initializing, by the AHCP, and then participating, by the AHCP, in the start-up procedure in which the AHCP wakes up and enables communication by the plurality of ePT ECUs/modules via the second CAN bus,
wherein a duration of the start-up procedure is less than a predetermined customer annoyance threshold.

11. The control method of claim 10, wherein the customer annoyance threshold is two seconds.

12. The control method of claim 11, wherein the duration of the start-up procedure is in a range of approximately 1760-1830 milliseconds.

13. The control method of claim 10, wherein the HCP does not perform a reset line test.

14. The control method of claim 10, wherein the AHCP and the HCP are configured in a secondary/primary relationship, and wherein the AHCP does not perform shutoff path testing.

15. The control method of claim 10, wherein the HCP and the AHCP are implemented by separate cores of a multi-core processor.

16. The control method of claim 10, wherein the HCP performs the shutoff path testing in parallel while the AHCP wakes up and enables communication by the plurality of ePT ECUs/modules via the second CAN bus.

17. The control method of claim 10, wherein the AHCP is configured to send a first set of network management messages at an enhanced cycle rate to wakeup and enable communication by the plurality of ePT ECUs/modules via the second CAN bus, and wherein the enhanced cycle rate is faster than a normal cycle rate.

18. The control method of claim 17, wherein the first set of network management messages is a first ten messages, the enhanced cycle rate is approximately 100 milliseconds, and the normal cycle rate is approximately 1000 milliseconds.

\* \* \* \* \*